(12) United States Patent
Kilbane

(10) Patent No.: US 8,806,446 B2
(45) Date of Patent: Aug. 12, 2014

(54) METHODS AND APPARATUS FOR DEBUGGING PROGRAMS IN SHARED MEMORY

(75) Inventor: Stephen M. Kilbane, Edinburgh (IE)

(73) Assignee: Analog Devices, Inc., Norwood, MA (US)

( * ) Notice: Subject to any disclaimer, the term of this patent is extended or adjusted under 35 U.S.C. 154(b) by 644 days.

(21) Appl. No.: 12/728,581

(22) Filed: Mar. 22, 2010

(65) Prior Publication Data

US 2011/0231827 A1   Sep. 22, 2011

(51) Int. Cl.
 *G06F 9/44* (2006.01)
(52) U.S. Cl.
 USPC .......................................................... 717/129
(58) Field of Classification Search
 CPC .............. G06F 11/3636; G06F 9/3851; G06F 11/3672; G06F 9/30032; G06F 11/362; G06F 9/3664; G06F 11/3644
 USPC .......................................................... 717/129
 See application file for complete search history.

(56) References Cited

U.S. PATENT DOCUMENTS

| | | | |
|---|---|---|---|
| 4,527,237 A * | 7/1985 | Frieder et al. ................. | 709/253 |
| 5,664,159 A | 9/1997 | Richter et al. | |
| 5,717,909 A | 2/1998 | Nemirovsky et al. | |
| 5,740,351 A | 4/1998 | Kasten | |
| 5,901,225 A | 5/1999 | Ireton et al. | |
| 5,937,154 A | 8/1999 | Tegethoff | |
| 5,951,696 A | 9/1999 | Naaseh et al. | |
| 6,016,555 A | 1/2000 | Deao et al. | |
| 6,145,123 A | 11/2000 | Torrey et al. | |
| 6,182,208 B1 | 1/2001 | Peri et al. | |
| 6,681,384 B1 | 1/2004 | Bates et al. | |
| 6,708,289 B1 | 3/2004 | Kudo | |
| 6,854,073 B2 | 2/2005 | Bates et al. | |
| 6,915,416 B2 | 7/2005 | Deng et al. | |
| 6,931,631 B2 | 8/2005 | Bates et al. | |
| 6,981,248 B2 | 12/2005 | Bates et al. | |
| 6,990,657 B2 | 1/2006 | Hunter et al. | |
| 7,055,140 B2 | 5/2006 | Bystricky et al. | |
| 7,131,114 B2 | 10/2006 | Nguyen et al. | |

(Continued)

FOREIGN PATENT DOCUMENTS

| | | |
|---|---|---|
| CN | 101216801 A | 7/2008 |
| EP | 0762278 | 3/1997 |
| EP | 762278 A1 * | 3/1997 |
| JP | 4190430 A | 7/1992 |

OTHER PUBLICATIONS

International Search Report and Written Opinion mailed Jun. 15, 2011 for International Application No. PCT/US2011/029131 (12 pages).

*Primary Examiner* — Li B Zhen
*Assistant Examiner* — Hui-Wen Lin
(74) *Attorney, Agent, or Firm* — Patent Capital Group

(57) ABSTRACT

A system debugging program code stored in shared memory and executed by multiple processors or processing cores. Exemplary operation includes determining if an address associated with an executing instruction is outside a first address range associated with the first processor, determining if the address associated with the executing instruction is outside a second address range associated with the second processor; and then raising an emulation event based on the first comparison but not the second comparison. Exemplary embodiments are also capable of identifying instructions corresponding to breakpoints which are executed by only one of multiple processors that execute program code stored in the shared memory.

20 Claims, 16 Drawing Sheets

(56) References Cited

U.S. PATENT DOCUMENTS

| | | |
|---|---|---|
| 7,162,664 B2 | 1/2007 | Haselden et al. |
| 7,185,321 B1 | 2/2007 | Roe et al. |
| 7,447,942 B2 | 11/2008 | Chen et al. |
| 7,506,205 B2 | 3/2009 | Pedersen et al. |
| 7,506,206 B2 | 3/2009 | Pedersen |
| 7,543,186 B2 | 6/2009 | Schultz |
| 7,574,585 B1 | 8/2009 | Nekl et al. |
| 7,584,456 B1 | 9/2009 | Veenstra et al. |
| 2002/0188813 A1 | 12/2002 | Cheung et al. |
| 2003/0154463 A1* | 8/2003 | Betker et al. .................. 717/129 |
| 2004/0031019 A1 | 2/2004 | Lamanna et al. |
| 2006/0248289 A1* | 11/2006 | Vantalon et al. .............. 711/153 |
| 2007/0079177 A1 | 4/2007 | Spirakis et al. |
| 2007/0168651 A1 | 7/2007 | John |
| 2009/0037704 A1 | 2/2009 | Thekkath |
| 2009/0187789 A1 | 7/2009 | Moyer et al. |
| 2009/0249046 A1* | 10/2009 | Berg et al. ..................... 712/227 |

* cited by examiner

METHODS AND APPARATUS FOR DEBUGGING PROGRAMS IN SHARED MEMORY

FIELD OF THE INVENTION

Embodiments of the present invention relate to debugging program code stored in shared memory.

BACKGROUND OF THE INVENTION

Debugging is an aspect of the design and development of computer software that involves testing and evaluating the software to identify and correct errors in the software logic. Often a programmer will use another computer program and associated hardware, commonly known as a "debugger," to debug software under development.

Conventional debuggers typically support two primary operations to assist a computer programmer. A first operation supported by conventional debuggers is a "step" function, which permits a computer programmer to process instructions (also known as "statements") in a computer program one-by-one, and see the results upon completion of each instruction. While the step operation provides a programmer with a large amount of information about a program during its execution, stepping through hundreds or thousands of program instructions can be extremely tedious and time consuming, and may require a programmer to step through many program instructions that are known to be error-free before reaching a set of instructions to be analyzed.

To address this difficulty, a second operation supported by conventional debuggers is a breakpoint operation, which permits a computer programmer to identify with a "breakpoint" a precise instruction at which to halt execution of a computer program. As a result, when a debugger executes a computer program, the program executes in a normal fashion until it reaches a breakpoint and then stops. Once execution stops, a programmer can view a snapshot of the execution, including, for example, the program state and the value of variables. Further, upon reaching the breakpoint the programmer may step through the desired set of instructions one instruction at a time.

There are two conventional techniques for inserting breakpoints: (1) inserting the breakpoint into the software's object code, and (2) inserting a hardware breakpoint. Software breakpoints work by replacing a machine instruction with an emulation-trap instruction; when executed, this instruction causes the processor to vector to a routine that passes control to the debugger, which can then single-step the processor. Methods of inserting the breakpoint are well known in the art. For example, the debugger may simply write an instruction (e.g., an opcode) over the first byte or bytes of the target instruction that causes an interrupt to be fired whenever execution is transferred to the instruction's address. When this happens, the debugger "breaks in" and swaps the opcode byte with the original first byte of the instruction, so that the processor can continue execution without immediately hitting the same breakpoint.

Software breakpoints have limited usefulness, however, when programs are stored in shared memory, or the program is self-modifying. Shared memory is memory that may be simultaneously accessed by multiple programs, processors, or processing cores, sometimes to provide communication among the programs or conserve memory. Depending on the context, programs may run on a single processor or on multiple separate processors. If a breakpoint is inserted into code stored on shared memory and simultaneously executed by multiple cores, then any of the cores may encounter the breakpoint. If there are multiple debugging sessions active (e.g., each for a different core), the encountering session may not expect the breakpoint and will not have the original instruction saved, and therefore cannot continue execution. Further, if a programmer only intends to halt a single core, other cores may nevertheless halt and interfere with time critical behavior. Finally, when a debugger single-steps a core after halting, the debugger temporarily replaces the breakpoint with the original instruction; while the breakpoint is replaced another core may run through where the breakpoint should have been without halting.

There is another problem with debugging shared memory when two debuggers are active. Assume that two separate debuggers (Debuggers A and B) control two processors, and each debugger has the same breakpoint set internally. Debugger A reads the original instruction from shared memory and replaces it with the software breakpoint instruction. Debugger B reads the software breakpoint instruction instead of the original instruction and replaces the software breakpoint instruction with another software breakpoint instruction. When the processor under the control of Debugger B encounters the breakpoint and Debugger B begins step through of the breakpoint, Debugger B "restores" the breakpoint instruction with the erroneously stored breakpoint instruction.

Given the increased prevalence of multi-core processors, inserting software breakpoints into code stored on shared memory becomes even less feasible for debugging purposes.

One technique for inserting software breakpoints in shared memory is described in U.S. Pat. No. 6,990,657, SHARED SOFTWARE BREAKPOINTS IN A SHARED MEMORY SYSTEM. According to this technique, when a debug session sets a software breakpoint in shared memory, all active debug sessions are notified that the software breakpoint is set, and likewise notified when that software breakpoint is subsequently cleared. This approach still requires that every processor halt when any processor reaches a breakpoint and has a dramatic effect on run-time performance.

Another technique for managing software breakpoints in shared memory is described in U.S. Pat. No. 7,131,114, DEBUGGER BREAKPOINT MANAGEMENT IN A MULTICORE DSP DEVICE HAVING SHARED MEMORY. According to this technique, a DSP device comprising a shared memory is implemented in a host system. The host system debugs each of a plurality of processor subsystems in the DSP device and coupled to the shared memory. The host inserts a software breakpoint, and when a subsystem trips a breakpoint, the host determines whether the breakpoint is associated with the subsystem and if not, causes the subsystem to execute the original software instruction. This approach requires that all subsystems that have a breakpoint associated with the triggered location halt, and dramatically effects the run-time performance of processors.

Hardware breakpoints are more powerful and flexible than software breakpoints. Unlike software breakpoints, hardware breakpoints may set "memory breakpoints", or a breakpoint that is fired when any instruction attempts to read, write, or execute (depending on the breakpoint is configured) a specific address. There is also support for setting breakpoints on I/O port access. Hardware breakpoints have some limitations, however; the main limit being that the number of active hardware breakpoints is typically small. For example, on a typical x86 microprocessor, only four hardware breakpoints may be active at the same time.

Self-modifying software instructions also pose a problem for debugging systems. Self-modifying code is code that alters its own instructions while executing—perhaps to reduce the instruction path length and improve performance, or simply to reduce otherwise repetitively similar code. Self-modification is an alternative to the method of "flag setting" and conditional program branching used primarily to reduce the number of times a condition needs to be tested. Self-modifying code is straightforward to implement when using assembly language. Instructions can be dynamically created in memory (or else overlaid over existing code in non-protected program storage) in a sequence equivalent to the instructions that a standard compiler would generate as object code.

When a breakpoint is inserted into self-modifying program code, there is always the possibility that the self-modifying code will overwrite the breakpoint. The same drawbacks for hardware breakpoints used with self-modifying program code exist as with shared memory.

Thus, there is a need for a technique for inserting breakpoints in shared memory that has the flexibility of hardware breakpoints, but with the availability of software breakpoints that also addresses the issues presented by self-modifying code.

SUMMARY OF THE INVENTION

The present invention is directed toward an improved system for debugging software that is stored in shared memory and executed simultaneously by more than one processor or processing core. Benefits include more efficiently utilizing the processors by avoiding unnecessarily halting one or more processors that are not to undergo debugging. Those of ordinary skill in the art will recognize other benefits and uses of the present invention.

Exemplary embodiments consistent with the present invention provide methods and apparatus for debugging program code stored in shared memory. According to one aspect of the present invention, a method of debugging the execution of instructions stored on shared memory by a first processor and a second processor is provided that includes loading a first instruction address range associated with a first processor; loading a second instruction address range associated with a second processor; and raising an emulation event if a current instruction address is outside a loaded address range.

According to another aspect of the present invention, a method of debugging the execution of instructions by a first processor and a second processor is provided that includes determining if an address associated with an executing instruction is outside a first address range associated with the first processor; determining if the address associated with the executing instruction is outside a second address range associated with the second processor; and raising an emulation event based on the first comparison but not the second comparison.

According to another aspect of the present invention, a computing device is provided that includes a memory having executable instructions stored therein; a first processor associated with a first set of address registers defining a first address range in the memory; a second processor associated with a second set of address registers defining a second address range in the memory; and each of the first processor and the second processor having logic for halting execution if the address of an executing instruction is outside one of the first and second address ranges.

According to another aspect of the present invention, a debugging system is provided that includes a memory module having executable instructions stored therein; a first processing module associated with a first set of address registers defining a first address range in the memory; a second processing module associated with a second set of address registers defining a second address range in the memory; and each of the first processing module and the second processing module having logic for halting execution if the address of an executing instruction is outside one of the first and second address ranges.

The foregoing and other features and advantages of the present invention will be made more apparent from the description, drawings, and claims that follow. One of ordinary skill in the art, based on this disclosure, would understand that other aspects and advantages of the present invention exist.

BRIEF SUMMARY OF THE FIGURES

The following detailed description of the exemplary embodiments will be given with reference to the following Figures.

DETAILED DESCRIPTION OF THE EXEMPLARY EMBODIMENTS

Figure 1:
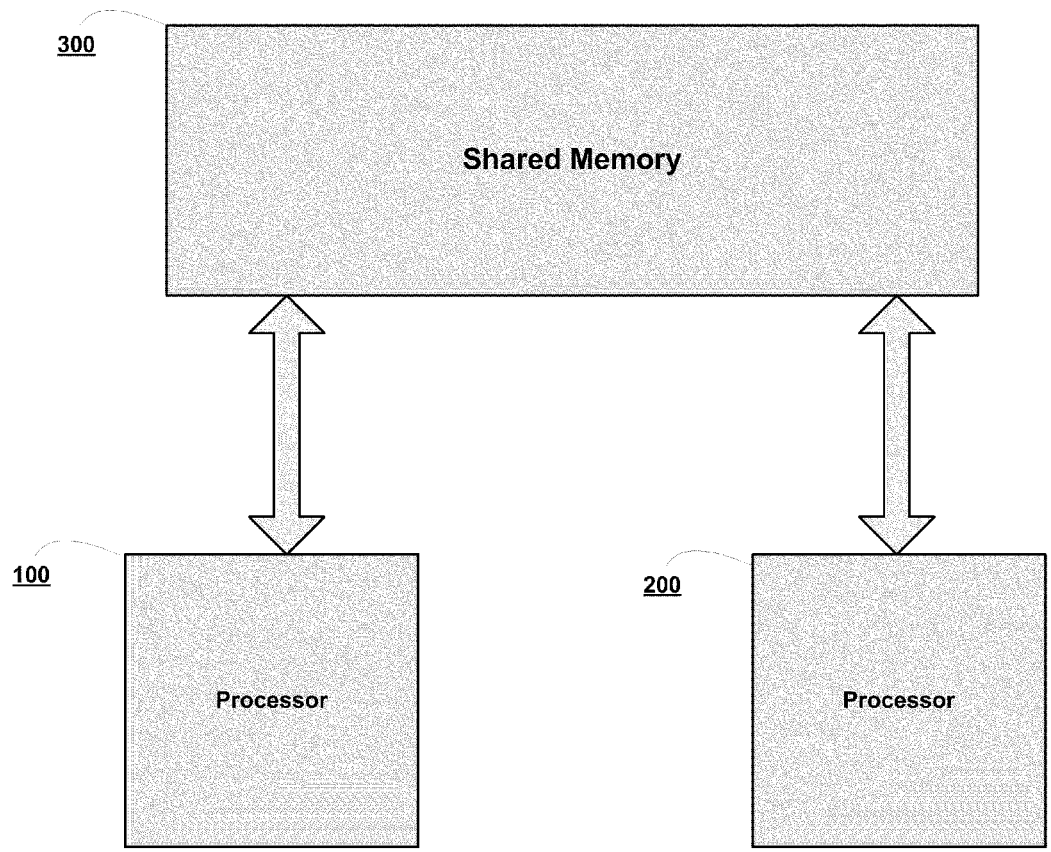
FIG. 1 is a shared memory system according to an exemplary embodiment of the present invention.

FIG. 1 illustrates a multi-processor system with access to a shared memory. The system includes Processor 100, Processor 200 and Shared Memory 300. The Processor 100 and Processor 200 are connected to the Shared Memory 300. The Shared Memory 300 includes program code executed by both Processor 100 and Processor 200.

Figure 2:
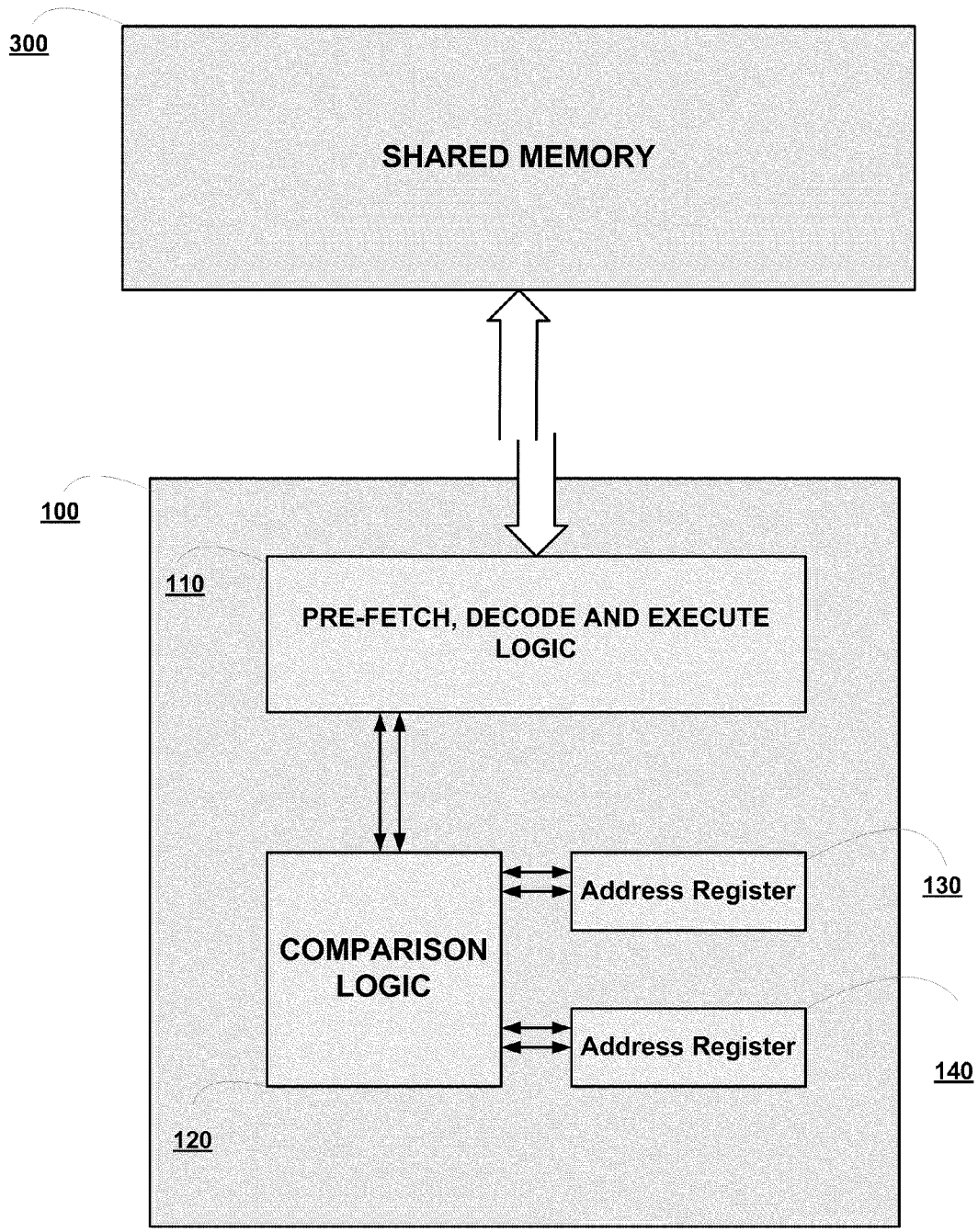
FIG. 2 is a processor running program code on a shared memory according to an exemplary embodiment of the present invention.

FIG. 2 illustrates the Processor 100 according to an exemplary embodiment of the present invention. While described in relation to Processor 100, the description is equally applicable to Processor 200. Processor 100 includes Pre-fetch, Decode and Execute Logic 110, Comparison Logic 120, Address Register 130, and Address Register 140. The Address Registers 130 and 140 form a hardware breakpoint range, specifying start and end addresses in the Shared Memory 300. The Processor 100 is configured to raise an emulation event when attempting to execute an instruction outside the range specified by the register pair. The Comparison Logic 120 includes the logic for determining whether the current instruction address is within the range delineated by the pair of address registers. In one exemplary embodiment, the Comparison Logic 120 merely outputs a 'yes' or 'no' value (i.e., logic '1' or logic '0'), where the 'yes' value raises the emulation event, halting normal instruction execution of the Processor 100. Here, the current instruction address is retrieved from the Pre-Fetch, Decode and Execute Logic 110. As is known to those of ordinary skill in the art, the address of one or more instructions is often stored in on-board memory, for example Level-0 cache or another quick access memory, that is part of the Pre-Fetch, Decode, and Execute Logic 110.

The Comparison Logic 120 may monitor instruction addresses traveling on the bus, may fetch the address, or may use any other technique known to those of ordinary skill in the art. Further, although this disclosure refers to the "current instruction address," that does not mean execution is imminent when the techniques described herein are performed. As is known to those of ordinary skill in the art, processors can pre-fetch batches of instructions, thus, the comparisons described herein may be performed well before an instruction corresponding to a "current instruction address" is to be executed.

Figure 3:
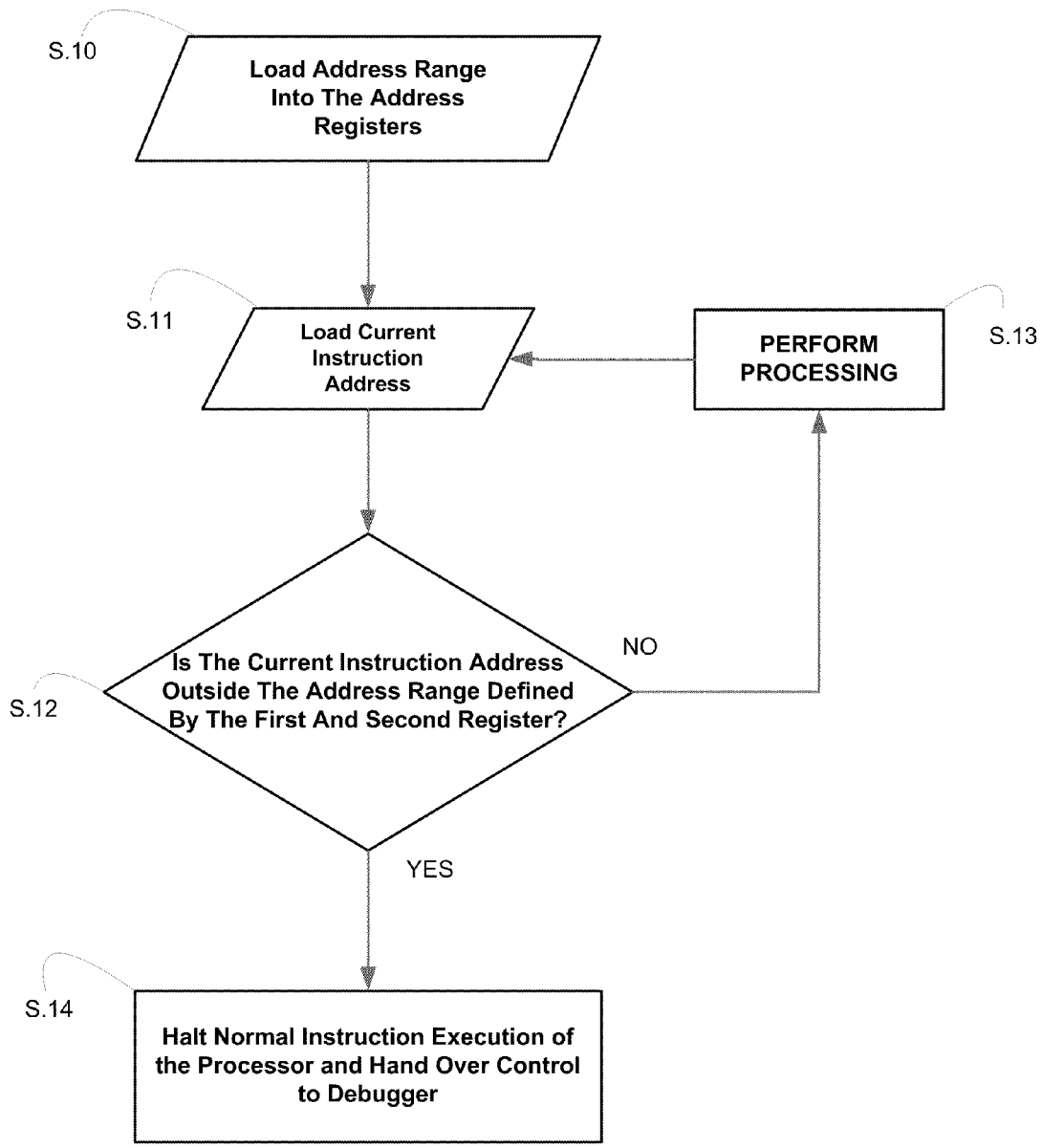
FIG. 3 is a flow chart illustrating an exemplary operation of the processor of FIG. 2.

An exemplary operation of the Processor 100 in debug mode will now be described with reference to FIGS. 2 and 3. Beginning and ending addresses within the shared memory are loaded into the Address Register 130 and Address Register 140, respectively, to define an address range (S.10). At a point prior to execution of a current instruction, the current instruction's address is loaded for comparison (S.11). The Comparison Logic 120 determines if the current instruction address is outside the range defined by the addresses loaded into the address registers (S.12). If the current instruction address is not outside the defined address range (i.e., is within the range), then the Processor 100 proceeds with normal instruction execution of the instruction at the current instruction address (S.13). If the current instruction address is outside the defined address range, then the processor halts and control is passed to a debugger (S.14).

Figure 4:
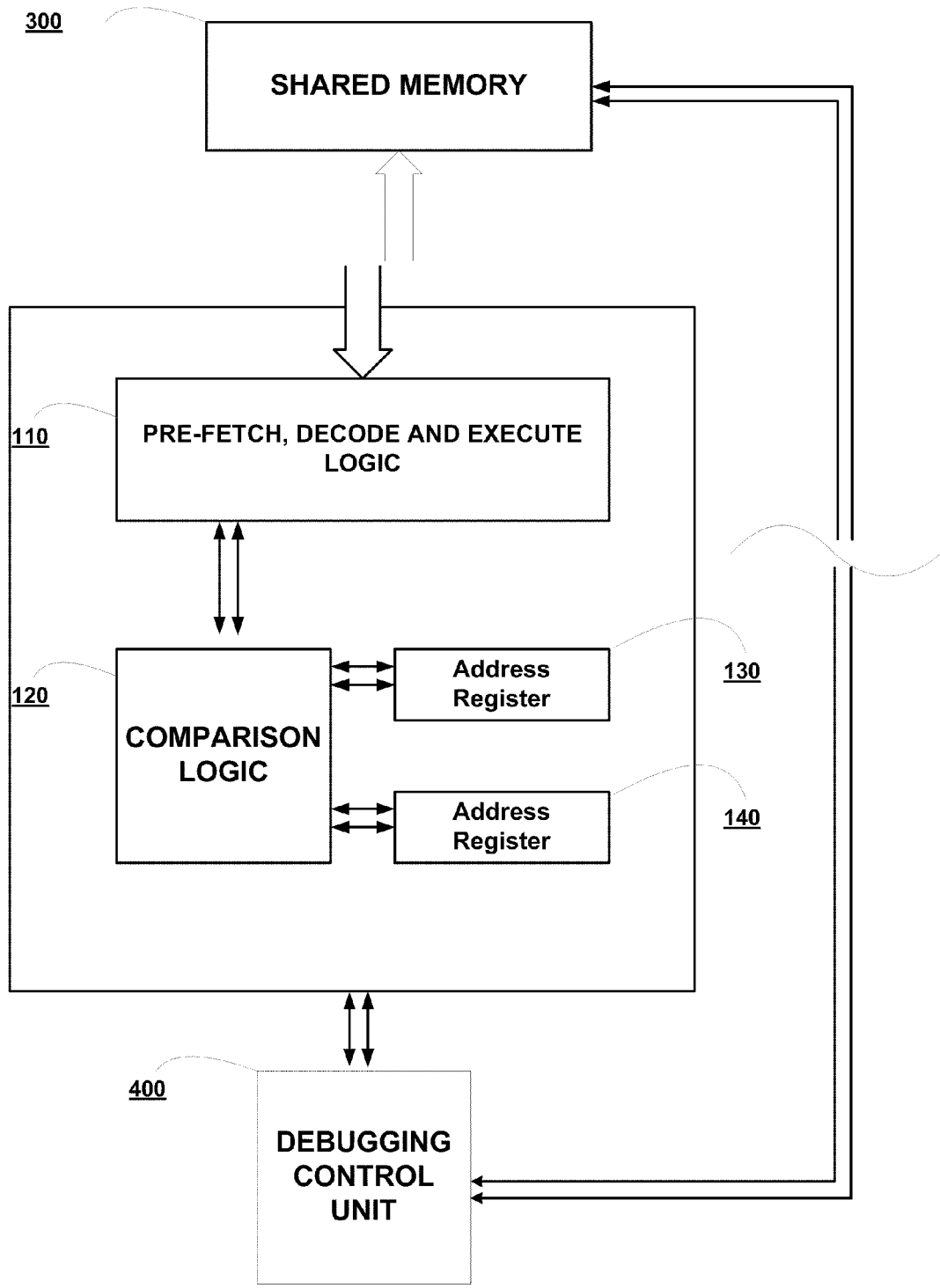
FIG. 4 is a shared memory system including a debugging control unit according to an exemplary embodiment of the present invention.
Figure 5:
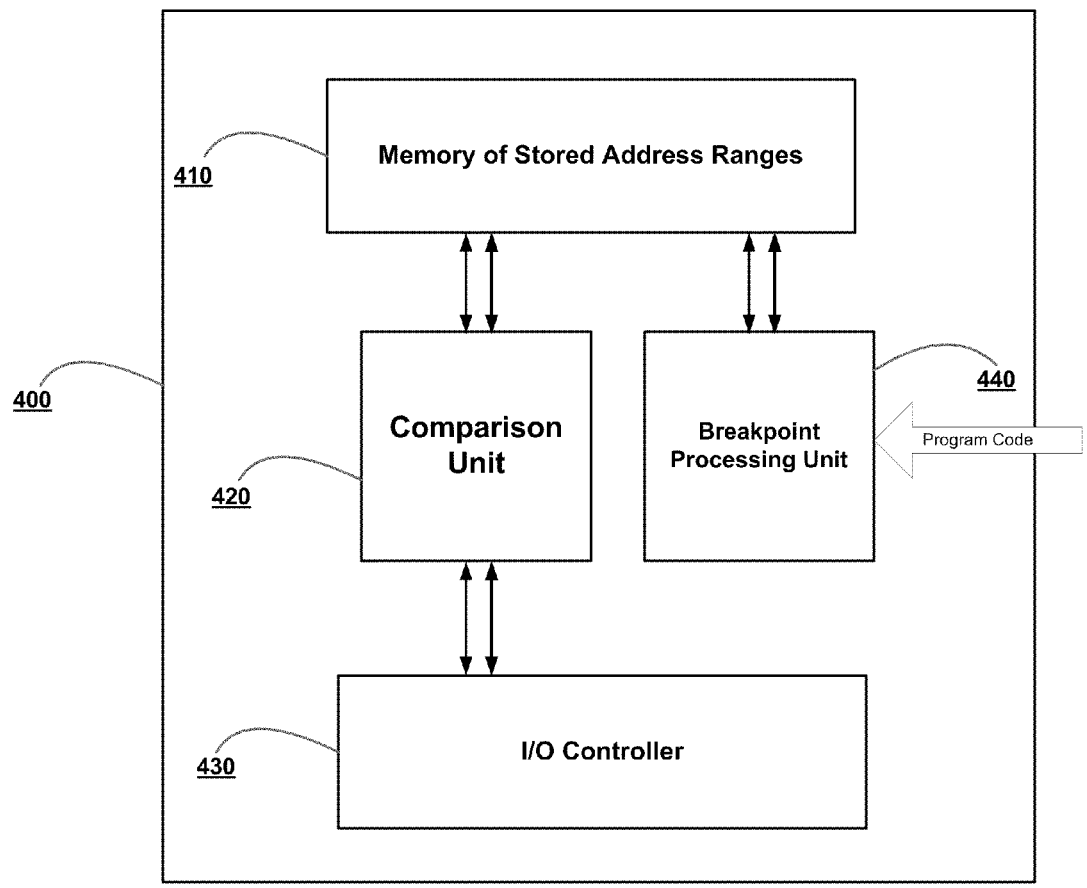
FIG. 5 is the debugging control unit of FIG. 4 according to an exemplary embodiment of the present invention.

After the Processor 100 halts, control is passed to the debugger. FIG. 4 illustrates the Debugging Control Unit 400 in combination with the Processor 100. With reference to FIG. 5, the Debugging Control Unit 400 includes a Memory 410, a Comparison Unit 420, an I/O Controller 430, and a Breakpoint Processing Unit 440. Address ranges are stored in the Memory 410 that define ranges of instruction addresses delineated by breakpoints.

Figure 6:
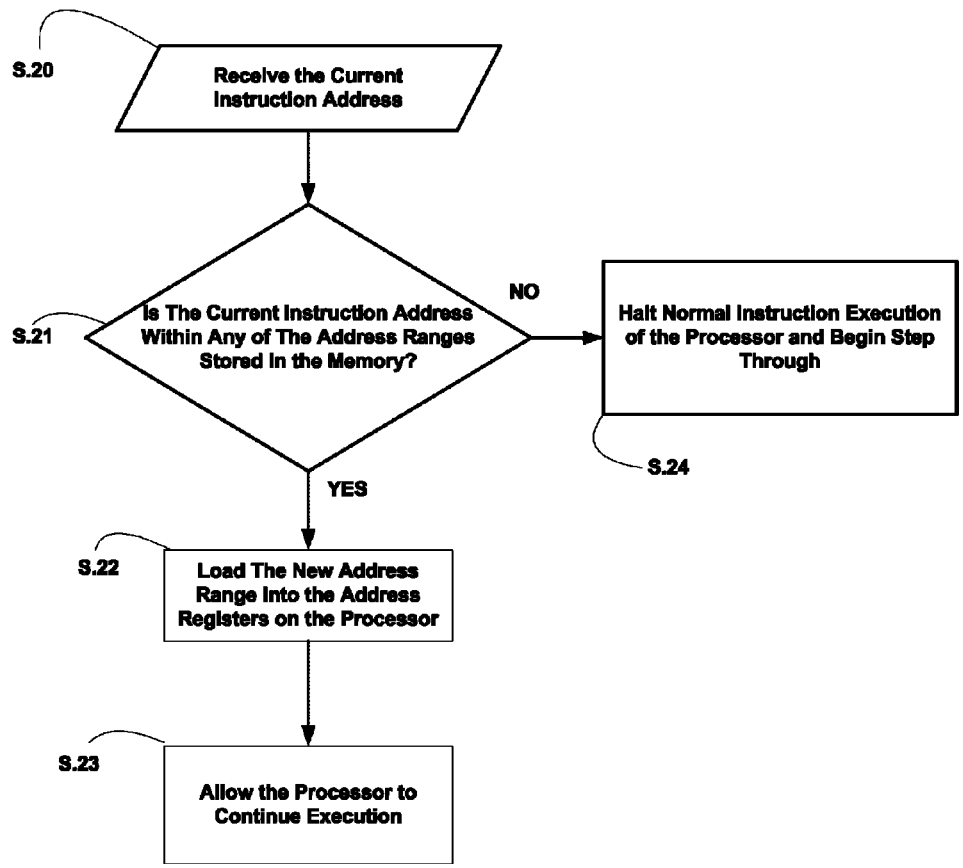
FIG. 6 is a flow chart illustrating an exemplary operation of the debugging control unit of FIG. 5 according to an exemplary embodiment of the present invention.

An exemplary operation of the Debugging Control Unit 400 will now be described with references to FIGS. 2, 5 and 6. First, the Debugging Control Unit 400 receives the current instruction address from the Processor 100 via the I/O Controller 430 (S.20). The Comparison Unit 420 determines whether the current instruction address falls within the range of one of the address ranges stored in the Memory 410 (S.21). If the current instruction address falls within an address range stored in the Memory 410, then the new address range is loaded into the address registers of Processor 100 (S.22), and the Processor 100 is allowed to execute the instruction and proceed normally (S.23).

If the current instruction address does not fall within an address range stored in the Memory 410, then the current instruction address corresponds to a breakpoint, and the Debugging Control Unit 400 returns control to a user and begins step through (S.24). In one exemplary embodiment, the Debugging Control Unit 400 steps the Processor 100 by inserting into the pair of address registers the address of the breakpoint. For example, if the breakpoint is at address A1, the Debugging Control Unit 400 inserts the address A1 into both address registers (i.e., address range A1-A1) in the Processor 100. Thus, the Comparison Logic 120 does not raise an emulation event when the address A1 is compared to the address range A1-A1. When the Processor 100 steps to the next instruction address, it is outside the range A1-A1 and returns control to the Debugging Control Unit 400, which then engages in its normal operation.

Figure 7:
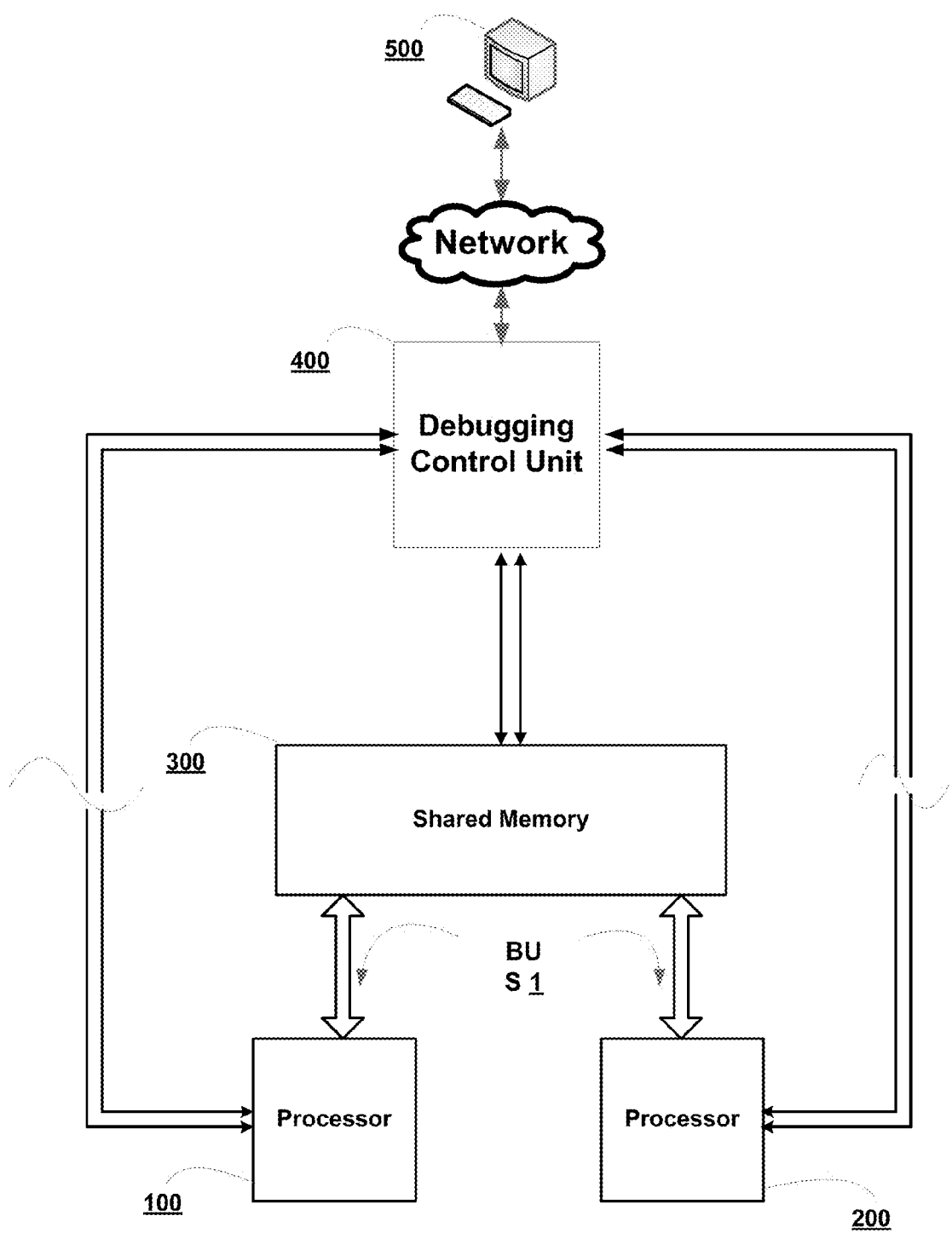
FIG. 7 is a shared memory system including a user terminal according to an exemplary embodiment of the present invention.

The Debugging Control Unit 400 stores in the memory 410 the above mentioned address ranges of program instructions stored in the Memory 300. In this exemplary embodiment, the address ranges are based without limitation, in part on the breakpoints identified by a user. In one exemplary embodiment illustrated with reference to FIGS. 5 and 7, a user selects breakpoints for insertion via a Terminal 500. The Terminal 500 communicates the selected breakpoints to the Debugging Control Unit 400. The Breakpoint Processing Unit 440 of the Debugging Control Unit 400 determines address ranges between the various user selected breakpoints. In FIG. 7, the Network refers to a LAN (local-area-network), WAN (wide-area-network), and also a more permanent connection where the Debugging Control Unit 400, Shared Memory 300, and Processors 100 and 200 are all located within the Terminal 500.

Figure 8:
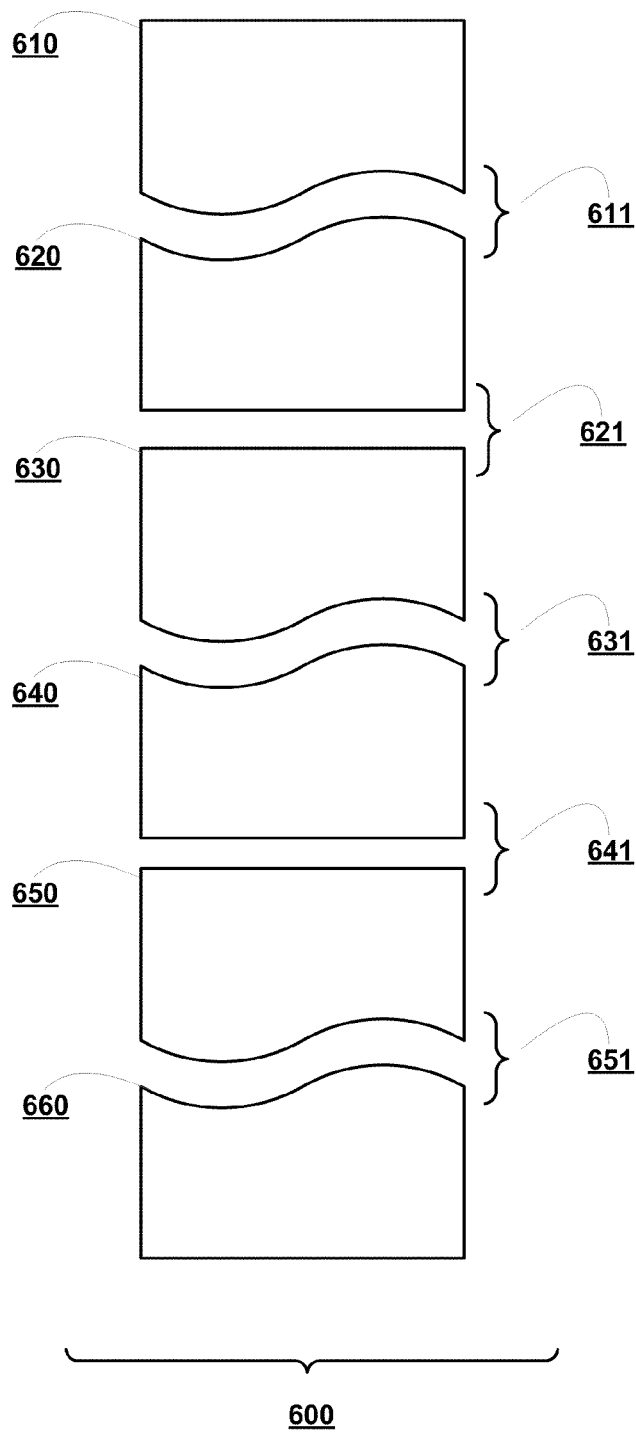
FIG. 8 is a visual illustration of program code processed to identify address ranges defined by breakpoints according to an exemplary embodiment of the present invention.

FIG. 8 illustrates the address ranges determined by the Breakpoint Processing Unit 440. The user has set five breakpoints at addresses corresponding to reference numbers 611, 621, 631, 641, and 651. These breakpoints define the address ranges corresponding to reference numbers 610, 620, 630, 640, 650 and 660. Thus, given program code stored from addresses A1 to A20, if the user selects breakpoints at addresses A4 and A9, then the Breakpoint Processing Unit 440 determines ranges at least of A1 to A3, A5 to A8, and A10 to A20. Although this exemplary embodiment illustrates sequential addressing, in practice, the address ranges of the program code could be out of sequence, especially if the program code accesses memory segments or other stored values, or communicates with attached devices via registers and ports.

Figure 9:
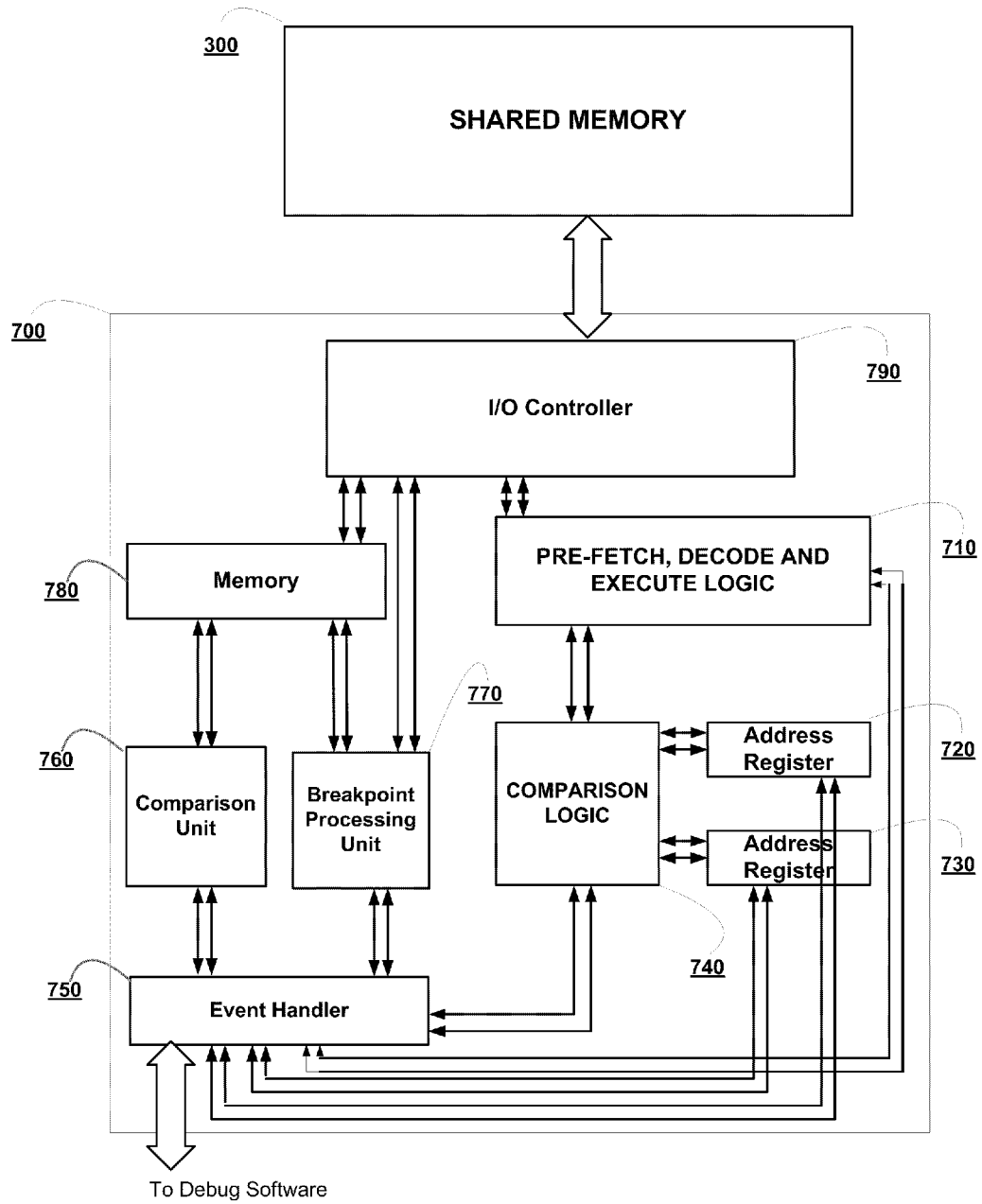
FIG. 9 is a processor that includes debugging circuitry according to an exemplary embodiment of the present invention.

FIG. 9 illustrates another exemplary embodiment of the present invention. In this exemplary embodiment, the behavior implemented in the Debugging Control Unit 400 (FIG. 5) is implemented in the Processor 700. According to this exemplary embodiment the Processor 700 includes a Pre-Fetch, Decode and Execute Logic 710, Address Register 720, Address Register 730, Comparison Logic 740, Event Handler 750, Comparison Unit 760, Breakpoint Processing Unit 770, Memory 780, and I/O Controller 790. The Pre-Fetch, Decode and Execute Logic 710, Address Register 720, Address Register 730, and Comparison Logic 740 operate similar to the description above. However, upon halting the normal instruction execution of the Processor 700 because the current instruction address is outside of the range defined by the Address Registers 720 and 730, the Event Handler 750 controls the Comparison Unit 760 to determine whether the current instruction address falls within one of the address ranges stored on the Memory 780. The Event Handler 750 also handles loading new address ranges into the Address Registers 720 and 730, and re-instating the execution of the Processor 700 after debugging is complete. One benefit of handling the debugging functionality within the Processor 700 is that operations occur much faster. This is especially true when execution is halted because the current instruction address is outside the range loaded onto the Address Registers 720 and 730, but the Comparison Unit 760 determines that the current instruction address is within another range stored on the Memory 780, which address range is loaded onto the address registers.

According to the exemplary embodiment illustrated in FIG. 9, the Breakpoint Processing Unit 770 determines the address ranges to store in the Memory 780, based in part upon the program instructions stored in Shared Memory 300.

Figure 10A:
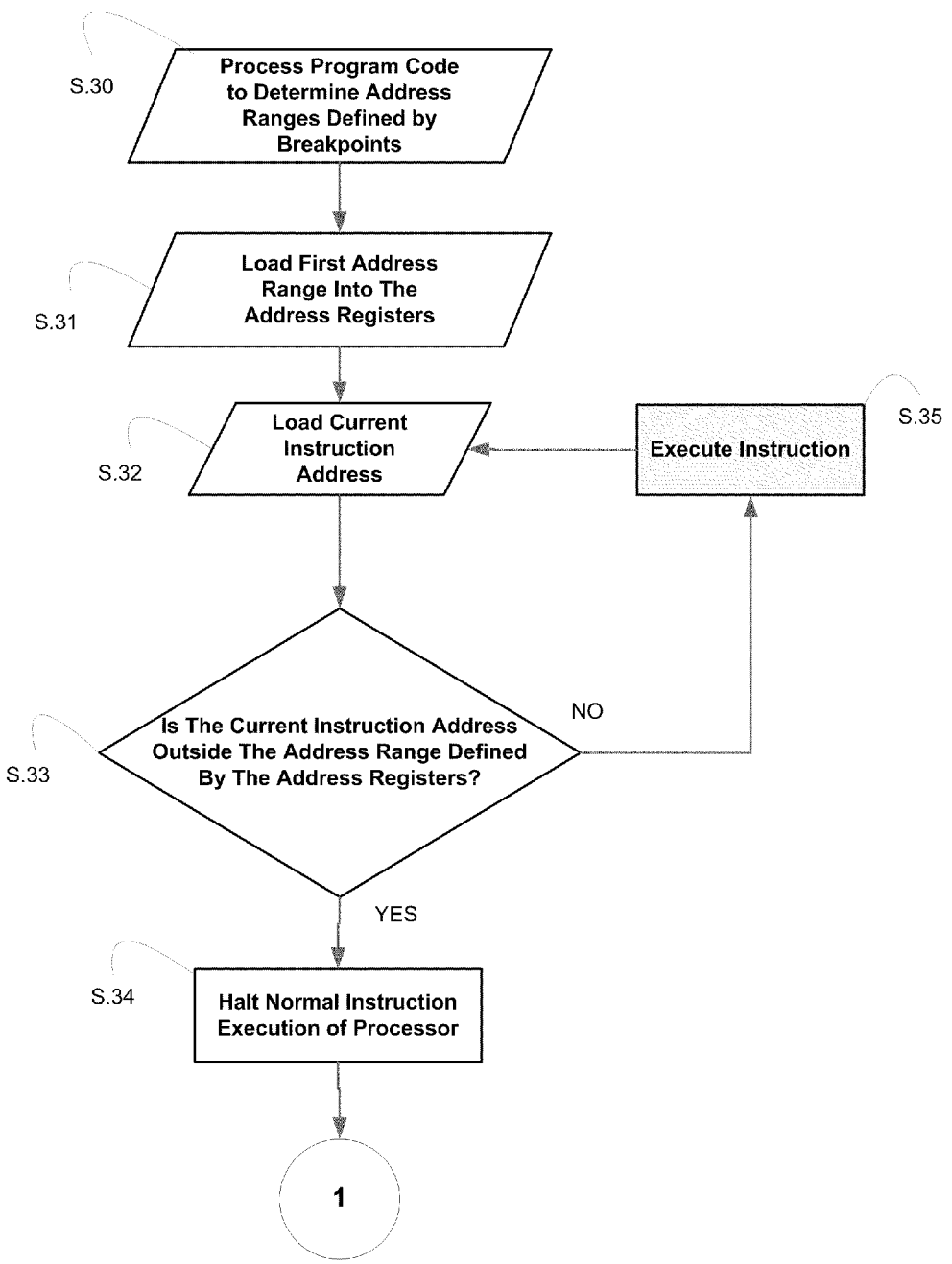
FIGS. 10a and 10b are flow charts illustrating an exemplary operation of the processor including the debugging circuitry of FIG. 9.
Figure 10B:
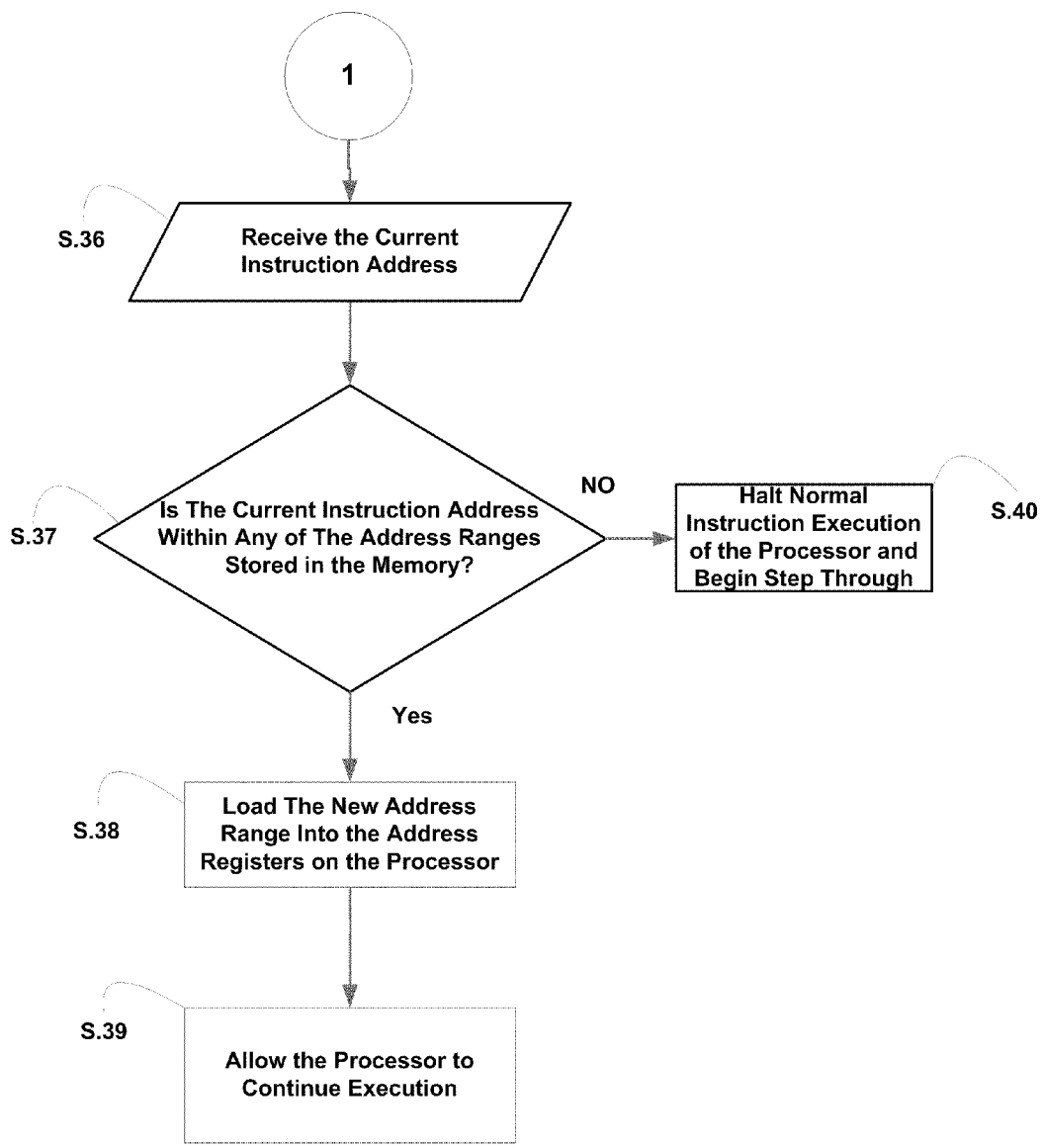

FIGS. 10a and 10b illustrate an exemplary operation of the Processor 700 with reference to FIG. 9. First, the Breakpoint Processing Unit 770, via I/O Controller 790 loads the program instructions stored in Shared Memory 300 and determines the address ranges based, in part, on the breakpoints selected by the user and communicated from Debugging Software via the Event Handler 750 (S.30). One of ordinary skill in the art would understand that the breakpoints may be communicated directly to the Breakpoint Processing Unit 770. One of ordinary skill in the art would also understand that there are multiple ways that the loading of the program code could be initiated. If the Shared Memory 300 is specific to the Processor 700, then the program code could be loaded upon power up. Alternatively, loading software into the Shared Memory 300 or connecting the Shared Memory 300 creates an event communicated to the Event Handler 750, which then controls the Breakpoint Processing Unit 770 to load and process the program code.

After the Breakpoint Processing Unit 770 determines the address ranges, the first address range is loaded into the Address Registers 720 and 730 (S.31). One of ordinary skill in the art would recognize that there is more than one technique for determining which range to load prior to execution. According to one exemplary embodiment, the Event Handler 750 loads addresses into the Address Registers 720 and 730 that define a range outside the address range of the entire program code. If program code on the Shared Memory 300 must fall within the range A1 to A100, then at start up the Event Handler 750 loads range B1 to B2 into the Address Registers 720 and 730, respectively. Thus, the address of the first instruction code will not fall within the range defined by the Address Registers 720 and 730, the execution will halt, and the Event Handler 750 will control the Comparison Unit 760 and Memory 780 to determine the address range within which the current instruction address falls. This technique is beneficial because if a breakpoint is set at the beginning of the program code (i.e., at the start of execution) the Comparison Logic 740 will halt execution and the debugging circuitry will determine that the instruction address is a breakpoint.

Turning back to the exemplary operation illustrated in FIGS. 10a and 10b, the current instruction address is loaded (S.32), and is compared to the address range defined by the Address Registers 720 and 730 (S.33). If the current instruction address is outside the address range defined by the Address Registers 720 and 730, then execution is halted (S.34). Otherwise, the instruction is executed (S.35).

Turning to FIG. 10b, if the Processor 700 is halted, the Event Handler 750 controls the Comparison Unit 760 to search the address ranges stored in the Memory 780 and compare those ranges to the current instruction address (S.37). If the current instruction address does not fall within any of the address ranges stored in the Memory 780, the Event Handler 750 halts the normal instruction execution of the Processor 700 and step through may begin (S.40). Otherwise, the Event Handler 750 loads the address range within which the current instruction address falls into the Address Registers 720 and 730 (S.38), and allows the processor to continue execution (S.39).

According to another exemplary embodiment of the present invention, the Breakpoint Processing Unit 440 identifies the regions of code that are reached by multiple processors. Referring back to FIG. 1 where Processor 100 and Processor 200 both access the program code on Shared Memory 300, the Breakpoint Processing Unit 440 inserts software breakpoints into the program code using techniques known to those of ordinary skill in the art, if the Breakpoint Processing Unit 440 determines that the breakpoint is only ever reached by one processor. Those breakpoints which could be reached by both the Processor 100 and Processor 200 are implemented in hardware using the techniques described above.

In one exemplary embodiment, the Breakpoint Processing Unit 440 inserts bits into a breakpoint instruction inserted into shared memory to indicate the processor associated with the breakpoint. That is, bits are inserted into the breakpoints in order to indicate that the instruction is intended for a specific processor. This may be done in addition to utilizing addresses ranges as explained above, or in lieu of address ranges.

Similarly, according to another exemplary embodiment, the Breakpoint Processing Unit 440 inserts bits into an instruction to indicate that there is a breakpoint. For example, if an instruction is N-bits long, then the Breakpoint Processing Unit 440 sets bit M to indicate a breakpoint at the instruction. This too may be done in addition to utilizing the address ranges as explained above, or in lieu of address ranges.

Figure 11:
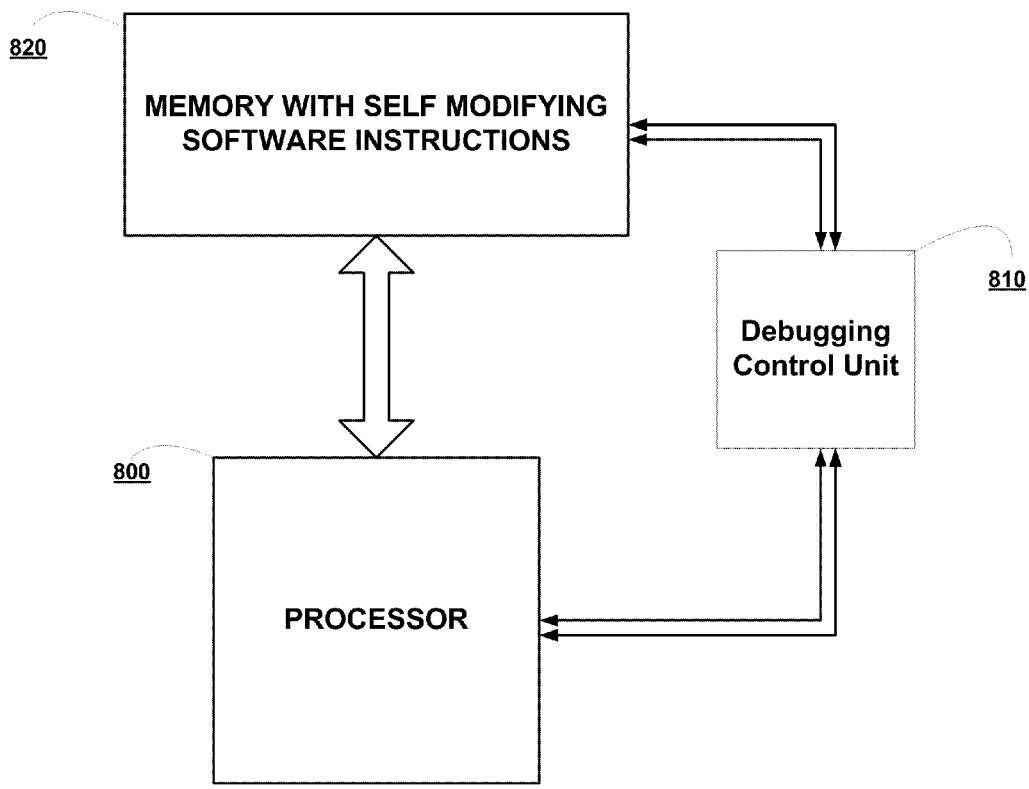
FIG. 11 illustrates a processor that inserts breakpoints into self-modifying software instructions according to exemplary embodiments of the present invention.

FIG. 11 illustrates an exemplary embodiment of the present invention, whereby a Processor 800 executes program code stored in a Memory 820 that includes self-modifying instructions, and debugging is controlled by the Debugging Control Unit 810. The exemplary operation is the same as the operations described above with regard to shared memory and is not repeated here.

Another exemplary embodiment of the present invention utilizes paging to optimize and streamline the application of the techniques described above. Paging systems allow storage and retrieval of data (from secondary storage or otherwise) for use in main memory. This allows for non-contiguous physical address space of program instructions. Data is organized and retrieved (e.g., by the operating system) in blocks called "pages." Such systems may be used in conjunction with cache control, memory protection, and virtual memory.

Figure 12:
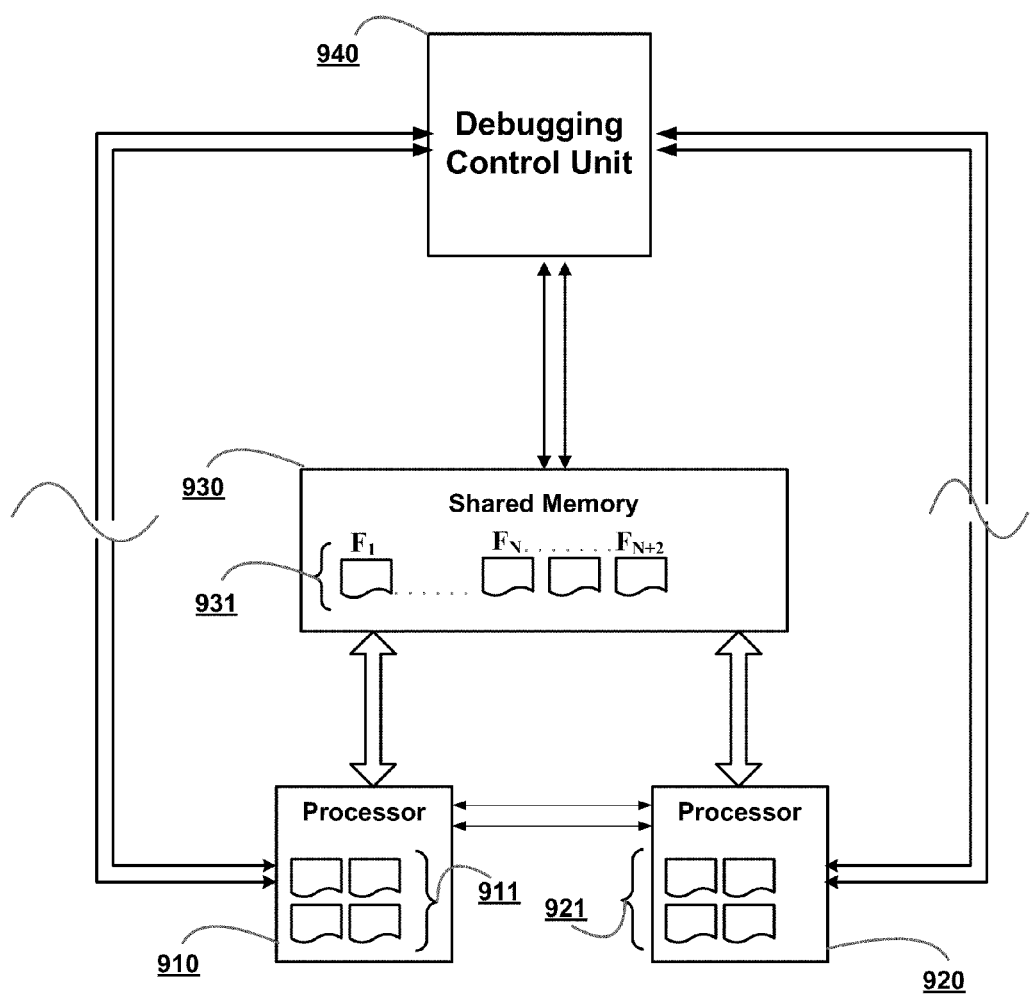
FIG. 12 illustrates the debugger utilized in a paging system according to an exemplary embodiment of the present invention

FIG. 12 illustrates a debugging system including two Processors 910 and 920, Shared Memory 930 and Debugging Control Unit 940. Processors 910 and 920 include Page Descriptor Registers 911 and 921, respectively, which facilitate each processor utilizing paging techniques. Program 931 is stored non-contiguously in page frames F1 to FN+2 in Shared Memory 930. The Page Descriptor Registers 911 and 921 store the page descriptors for the loaded pages from Shared Memory 930.

In the exemplary embodiment illustrated in FIGS. 12-15, page descriptors are held in memory (not shown) and multiplexed onto Page Descriptor Registers 911 and 921. Each instructions executed by Processor 910 or 920 is covered by a page descriptor in one of the registers. If an instruction address is not covered by a page descriptor in one of the registers, then an exception handler (not shown) searches a page table (not shown) for the faulting address, and replaces the contents of one of the Page Descriptor Registers 911 and 921 with the descriptor for the faulting address.

Figure 13:
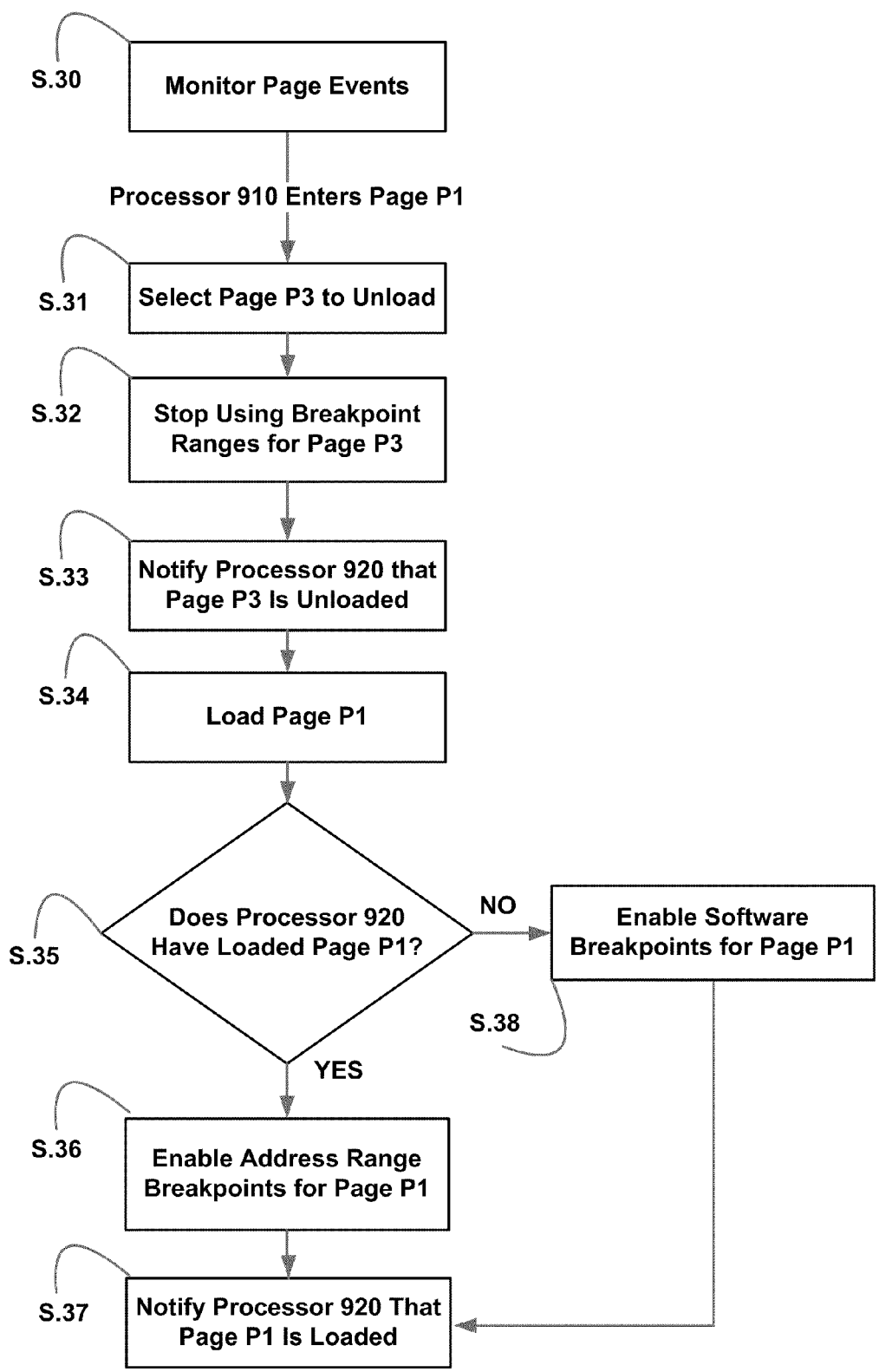
FIG. 13 is a flow chart illustrating an exemplary operation of the debugger utilized in the paging system of FIG. 12.

FIG. 13 illustrates an exemplary operation of Processor 910. In this example, Processors 910 and 920 each have loaded page P3, which includes a breakpoint for Processor 910. Processor 910 begins by monitoring page events in Processor 910 and from Processor 920, and Processor 910 enters page P1 (i.e., begins to load page P1), which covers the address of a breakpoint for Processor 910 (S.30). Processor 910 selects an old page, page P3, to unload (S.31), stops using address range breakpoints for the unloaded page P3 (S.32), and notifies Processor 920 that page P3 is now unloaded (S.33). Processor 910 loads the new page, page P1 (S.34), and then engages in a status check to determine if Processor 920 has loaded page P1 (S.35). If Processor 920 has loaded page P1, then Processor 910 enables address range breakpoints (S.36), and notifies Processor 920 that the page P1 is loaded (S.37). If Processor 920 does not have loaded page P1, then Processor 910 enables software breakpoints (S.38), and notifies Processor 920 that page P1 is loaded (S.36).

Figure 14:
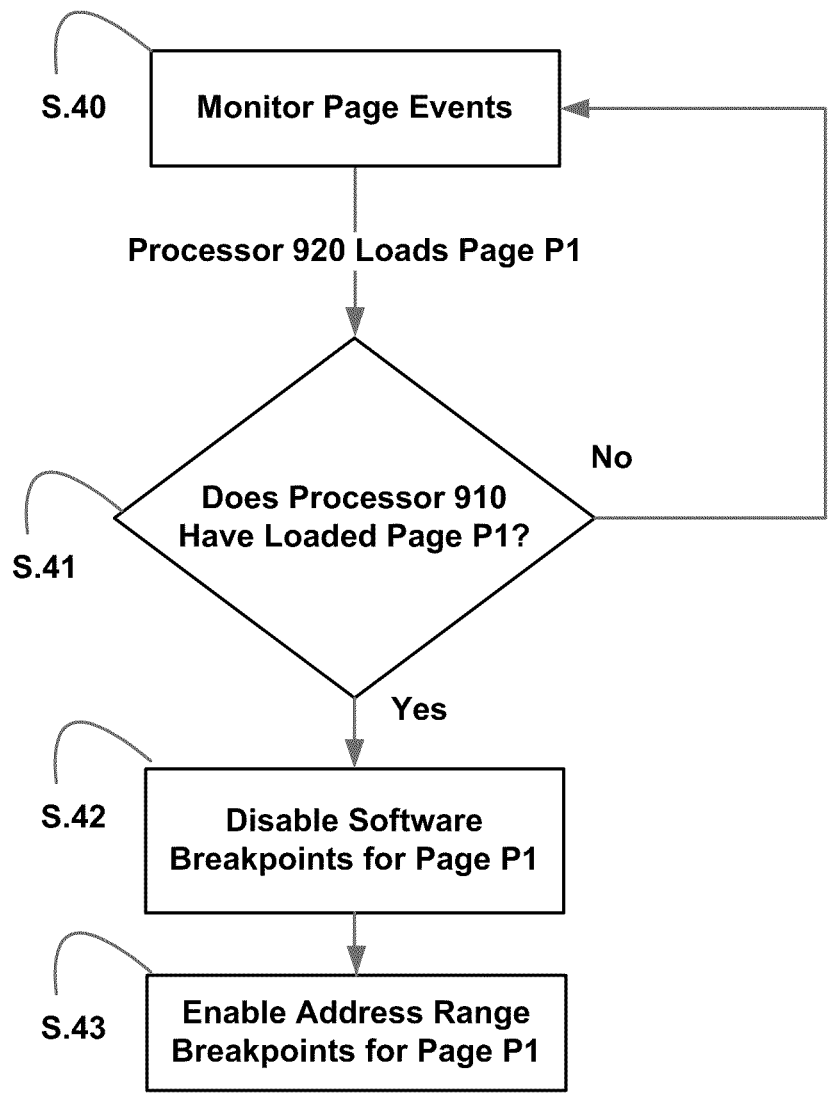
FIG. 14 is a flow chart illustrating an exemplary operation of the debugger utilized in the paging system of FIG. 12.

FIG. 14 illustrates another exemplary operation of Processor 910. Processor 910 begins by monitoring page events in Processors 910 and 920, and receives notification that Processor 920 loaded a new page, page P1, that includes a breakpoint relevant to Processor 910 (S.40). Processor 910 determines whether it has loaded the page P1 (S.41). If Processor 910 has loaded page P1, Processor 910 disables software breakpoints for that page (S.42), and enables address range breakpoints (S.43). If Processor 920 has not loaded the same page then it returns to monitoring page events (S.40).

Figure 15:
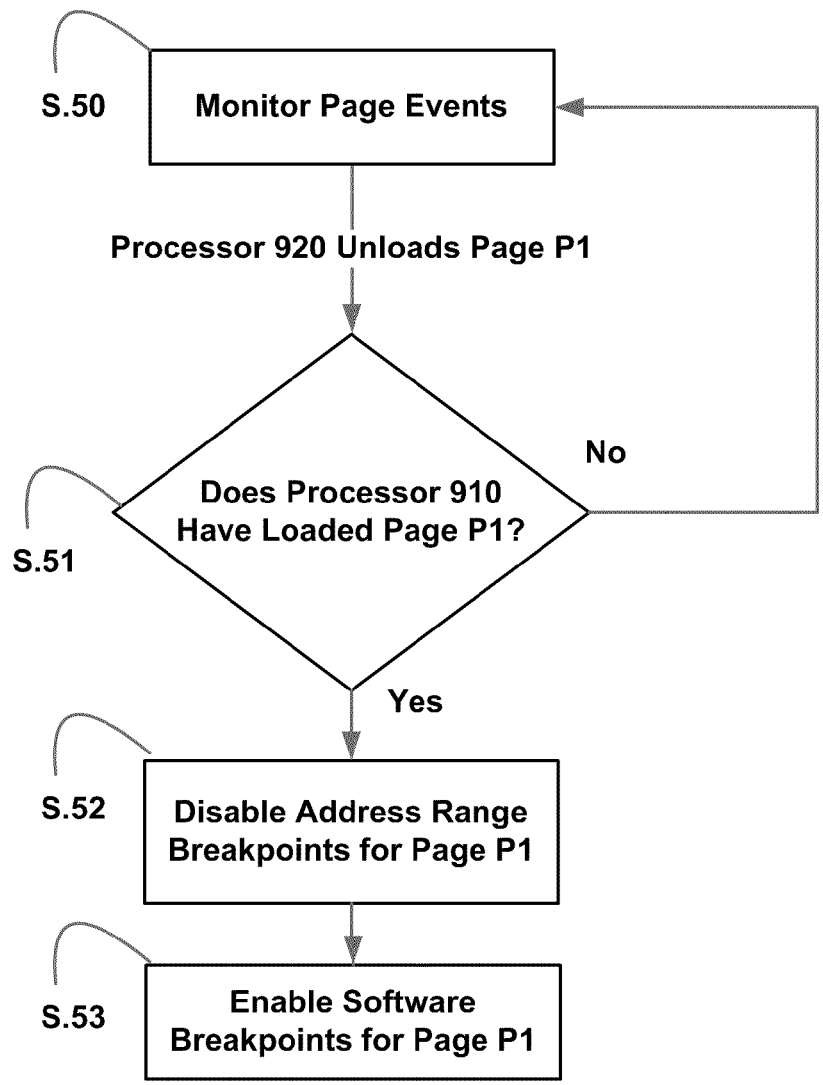
FIG. 15 is a flow chart illustrating an exemplary operation of the debugger utilized in the paging system of FIG. 12.

FIG. 15 illustrates another exemplary operation of Processor 910. Processor 910 begins by monitoring page events in Processors 910 and 920, and receives notification that Processor 920 unloaded a page, page P1, that includes a breakpoint relevant to Processor 910 (S.50). Processor 910 determines if it has already loaded page P1 (S.51). If Processor 910 has loaded page P1, then it disables address range breakpoints for page P1 (S.52), and enables software breakpoints for page P1 (S.53). If Processor 910 has not loaded the same page then it returns to monitoring page events (S.50).

FIGS. 13-15 illustrate exemplary operations of Processor 910 given certain page events (e.g., loading and unloading of pages by Processors 910 and 920). Although the operations in these figures are described with regard to Processor 910, the operations are equally applicable to Processor 920, thus, the invention should not be limited by the description of the operation of Processor 910.

FIGS. 13-15 illustrate exemplary operations of Processor 910 that include receiving and sending notifications to Processor 920. These notification may be managed by the Processor 910, or may be managed by Debugger Control Unit 940, which is otherwise managing the implementation of address range breakpoints. One of ordinary skill in the art would understand how to implement alternative techniques for managing the aforementioned notifications.

For simplicity, FIGS. 1-15 illustrate one or two processors, and the exemplary operations thereof. However, one of ordinary skill in the art would understand that the invention is scalable up to any large number of processors.

Although each exemplary operations illustrated by FIGS. 3, 6, 10A, 10B and 13-15 and accompanying text recites steps performed in a particular order, the present invention does not necessarily need to operate in that recited order. One of ordinary skill in the art would recognize many variations, including performing steps in a different order.

The exemplary embodiments of the present invention may be used in any processor, not just the x86 processors. One of ordinary skill in the art would understand that the invention disclosed herein is equally applicable to microprocessors, graphics processing units, video processing units, physics processing units, digital signal processors, network processors, front end processors, and co-processors. The processors may be found in embedded systems, and application specific integrated circuits (ASICS).

The debugging system, the individual components and elements thereof, and the methods illustrated in FIGS. 1 through 13 may be or include a computer system, or may be the components and sub-components of a computer system. The debugging system may be described in the general context of computer-executable instructions, such as program modules, being executed by a computer. Generally, program modules include routines, programs, objects, components, data structures, etc. that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an AS/400-based operating system, a OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The debugging system may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, C#, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module. Compression algorithms may be a series of instructions in software executed by general-purpose processor, or may be executed in hardware, for example, in a compression specific co-processor. Compression algorithms are well known in the art, but include lossless and lossy compression. Lossless compression algorithms may include Lempel-Ziv Welch (LZW), Lempel-Ziv 1 through 7, arithmetic encoding, Huffman encoding, combinations thereof (e.g., Deflate) or any other lossless encoding algorithm. Lossy compression algorithms may include, MPEG1 through 4, MP3, MP4. Off-the-shelf compression software may be utilized including Gzip™, WinZip™, FZip, DivX, FACC, or any other off-the-shelf compression software.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit (i.e., processor) that executes commands and instructions may be a general purpose computer, but may utilize any of a wide variety of other technologies including a special purpose computer, a microcomputer, mini-computer, mainframe computer, programmed microprocessor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

Furthermore, the memories may be arranged inside and outside the computer. For example, in a network, the system memory may include (or be part of) a distributed storage system that provides both storage and file-system functionality, such as network-attached-storage (NAS), or a distributed storage system that provides only storage, such as a storage-area-network (SAN). In the case of NAS, it may include software capable of file management services, including, without limitation, FreeNAS™, NASLite™, and NexentaStor™. The NAS may contain one or more hard disks, arranged into logical, redundant storage containers or RAID arrays. The NAS may utilize one or more file-based protocols including, without limitation, Network File System (NFS), Windows NT™ File System (NTFS), File Allocation Table (FAT), Server Message Block/Common Internet File System (SMB/CIFS), or Apple Filing Protocol (AFP).

In the case of a SAN, it may use any number of protocols to communicate between server and storage, including, without limitation, the SCSI protocol, HyperSCSCI protocol, iSCSI protocol, ATA over Ethernet, Fibre channel Protocol, and Fibre Channel over Ethernet.

Information stored on the system memories may be stored in a database. The particular architecture of the database may vary according to the specific type of data, mode of access of the data, or intended use of the data stored in the database; including, without limitation, a row-oriented data-store architecture, a column-based database management system, extensible-markup language, a knowledgebase, a frame database, or combinations thereof. A database management system (DBMS) may organize the storage of the data in the database, tailored for the specific requirements of the present system. The DBMS may use any number of query languages to access the database, including, without limitation, structured query language (SQL).

The database may reside within a single storage device within a single computer, multiple storage devices within a single computer, or multiple storage devices across multiple computers.

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. The present system may utilize any number of transport protocols, including, without limitation User Datagram Protocol (UDP), Transmission Control Protocol (TCP), Venturi Transport Protocol (VTP), Datagram Congestion Control Protocol (DCCP), Fibre Channel Protocol (FCP), Stream Control Transmission Protocol (SCTP), Reliable User Datagram Protocol (RUDP), and Resource ReSerVation Protocol (RSVP). For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

The invention claimed is:

1. A method of debugging computer instructions, the method comprising:
   determining a plurality of instruction address ranges corresponding to regions of a first memory, the plurality of instruction address ranges including a first instruction address range and a second instruction address range;
   loading the first instruction address range into registers in a first processor to form a hardware breakpoint range;
   enabling a software breakpoint, in response to a determination that a current instruction address is not within the first instruction address range; and
   loading the second instruction address range into the registers from a second memory external to the first processor, in response to a determination that the current instruction address is within the second instruction address range.

2. The method of claim 1, wherein the first processor is halted but a second processor that shares the first memory is not halted.

3. The method of claim 1, wherein an instruction at the current instruction address is executable by the first processor but not a second processor.

4. The method of claim 3, further comprising:
   inserting a breakpoint instruction at the current instruction address.

5. The method of claim 4, further comprising:
   inserting identifier bits in the inserted breakpoint instruction that identify the first processor.

6. The method of claim 2, further comprising:
   loading a third address range defined by the current instruction address.

7. A computing device, comprising:
   a memory having executable instructions stored therein;
   a debugging control unit;
   a plurality of instruction address ranges corresponding to regions of the memory, the plurality of instruction address ranges including a first instruction address range and a second instruction address range; and
   a first processor comprising
      (i) registers for storing the first instruction address range to form a hardware breakpoint range; and
      (ii) comparison logic that tests if a current instruction address is not within the first instruction address range,
   wherein the debugging control unit enables a software breakpoint, in response to a determination that the current instruction address is not within the first instruction address range, and supplies the second instruction address range from a memory in the debugging control unit to the first processor for storage in the registers, in response to a determination that the current instruction address is within the second instruction address range.

8. The computing device according to claim 7, the debugging control unit further comprising:
   a breakpoint processing unit operable to generate the plurality of instruction address ranges based on the executable instructions.

9. The computing device according to claim 8, wherein the debugging control unit is operable to multiplex the second instruction address range onto the registers.

10. A debugging system, comprising:
    a first memory that stores a plurality of instruction address ranges corresponding to regions of a second memory based on addresses of executable instructions, the plurality of instruction address ranges including a first instruction address range and a second instruction address range, the first instruction address range stored into registers in a processor to form a hardware breakpoint range; and
    means for enabling a software breakpoint, in response to a determination that a current instruction address is not within the first instruction address range, wherein the second instruction address range is loaded into the registers from a memory external to the processor, in response to a determination that the current instruction address is within the second instruction address range.

11. The debugging system of claim 10, further comprising:
    an event handler operable to multiplex an address range from the first memory to the registers in the processor.

12. The method of claim 1, further comprising:
    inserting into the registers an address range consisting of a single address, in response to a determination that the current instruction address is not within the second instruction address range.

13. The method of claim 1, further comprising:
    inserting a software breakpoint into code in the first memory, which is external to the first processor, in response to a determination that a breakpoint is reached by the first processor but not a second processor; and
    implementing the breakpoint in hardware, if the breakpoint is reached by the first processor and the second processor.

14. The computing device according to claim 7, wherein the debugging control unit inserts into the registers an address range consisting of a single address, in response to a determination that the current instruction address is not within the second instruction address range.

15. The computing device according to claim 7, wherein the debugging control unit inserts a software breakpoint into the executable instructions in the memory, in response to a determination that a breakpoint is reached by the first processor but not a second processor, wherein the breakpoint is implemented in hardware, if the breakpoint is reached by the first processor and the second processor.

16. The debugging system of claim 10, wherein the means inserts into the registers an address range consisting of a single address, in response to a determination that the current instruction address is not within the second instruction address range.

17. The debugging system of claim 10, wherein the means inserts a software breakpoint into the executable instructions in the second memory, which is external to the processor, in response to a determination that a breakpoint is reached by the processor but not another processor, and the breakpoint is implemented in hardware, if the breakpoint is reached by the processor and the other processor.

18. The method of claim 1, further comprising:
halting the first processor and passing control to a debugger, in response to the determination that the current instruction address is not within the first instruction address range.

19. The computing device according to claim 7, wherein the first processor is halted and control is passed to a debugger, in response to the determination that the current instruction address is not within the first instruction address range.

20. The debugging system of claim 10, wherein the processor is halted and control is passed to a debugger, in response to the determination that the current instruction address is not within the first instruction address range.

\* \* \* \* \*